United States Patent
Teichmiller et al.

(10) Patent No.: US 9,382,970 B1
(45) Date of Patent: Jul. 5, 2016

(54) SUBSEA REMOTELY OPERATED LIFTING SHACKLE

(71) Applicants: Noah Teichmiller, Houston, TX (US); Edward Nakajima, Sugar Land, TX (US)

(72) Inventors: Noah Teichmiller, Houston, TX (US); Edward Nakajima, Sugar Land, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 14/670,254

(22) Filed: Mar. 26, 2015

(51) Int. Cl.
*F16G 15/06* (2006.01)
*B23P 19/04* (2006.01)
*B66C 1/36* (2006.01)

(52) U.S. Cl.
CPC .............. *F16G 15/06* (2013.01); *B23P 19/04* (2013.01); *B66C 1/36* (2013.01)

(58) Field of Classification Search
CPC ............ F16G 15/06; B23P 19/04; B66C 1/36
See application file for complete search history.

(56) References Cited

U.S. PATENT DOCUMENTS

| 5,425,599 | A | 6/1995 | Hall et al. |
| 6,273,643 | B1 | 8/2001 | Baugh |
| 6,398,457 | B2 | 6/2002 | Baugh |
| 7,134,268 | B2 * | 11/2006 | Siappas ................... F16G 15/06 59/85 |
| 8,240,728 | B2 * | 8/2012 | Hwang .................... B66C 1/36 294/82.23 |
| 8,539,747 | B2 * | 9/2013 | Abrisketa Lozano .. F16G 15/06 294/82.1 |
| 9,067,660 | B2 * | 6/2015 | Van Steijn ............... F16G 15/06 |
| 2001/0033773 | A1 | 10/2001 | Baugh |
| 2001/0041095 | A1 | 11/2001 | Baugh |
| 2006/0101799 | A1 | 5/2006 | Siappas |

FOREIGN PATENT DOCUMENTS

| EP | 2149723 | 2/2010 |
| WO | WO 2006055581 | 5/2006 |

OTHER PUBLICATIONS

Green, B. "Subsea Mooring Systems—The Quiet Revolution." First Subsea. Offshore Engineer. vol. 33, No. 5, pp. 54-56, May 2008. www.offshore-engineer.com.

* cited by examiner

*Primary Examiner* — David B Jones
(74) *Attorney, Agent, or Firm* — King & Spalding LLP

(57) ABSTRACT

An actuator assembly for a subsea remotely operated lifting shackle for use in a subsea field operation is described herein. The actuator assembly can include an actuator body and an actuator coupled to the actuator body. The actuator assembly can also include at least one docking receptacle coupling feature operatively controlled by the actuator, where the at least one docking receptacle coupling feature removably couples, using the actuator, to at least one first actuator assembly coupling feature of a mounting adapter of the lifting shackle. The actuator assembly can further include at least one pin coupling feature operatively controlled by the actuator, where the at least one pin coupling feature removably couples, using the actuator, to at least one second actuator assembly coupling feature of the mounting adapter of the lifting shackle.

20 Claims, 9 Drawing Sheets

SUBSEA REMOTELY OPERATED LIFTING SHACKLE

TECHNICAL FIELD

The present disclosure relates generally to the subsea field operations, and more specifically to a lifting shackle that is remotely operated subsea.

BACKGROUND

Before, during, and after exploration and production of a subterranean wellbore, the equipment used for the various subsea field operations is placed, moved, and/or removed. Because of the size and scale of the exploration and production process equipment, tremendous care must be taken to ensure that the equipment is secure before placing, moving, or removing such equipment. Lifting shackles are commonly used to place, move, and remove this heavy, awkward equipment during subsea field operations.

SUMMARY

In general, in one aspect, the disclosure relates to a subsea remotely operated lifting shackle for use in a subsea field operation. The lifting shackle can include a first mounting adapter disposed over a portion of a first end of a shackle body. The first mounting adapter of the lifting shackle can include a frame and a docking receptacle coupled to the frame, where the docking receptacle includes at least one first actuator assembly coupling feature and a channel that traverses therethrough, where the channel aligns with a first aperture that traverses the first end of the shackle body. The lifting shackle can also include a pin having a proximal end, a distal end, and at least one second actuator assembly coupling feature disposed in the distal end, where the pin is disposed within the channel and the first aperture. The lifting shackle can further include an actuator assembly removably coupled to the first mounting adapter. The actuator assembly of the lifting shackle can include an actuator body and an actuator coupled to the actuator body. The actuator assembly of the lifting shackle can also include at least one docking receptacle coupling feature operatively controlled by the actuator, where the at least one docking receptacle coupling feature removably couples, using the actuator, to the at least one first actuator assembly coupling feature of the first mounting adapter. The actuator assembly of the lifting shackle can further include at least one pin coupling feature operatively controlled by the actuator, where the at least one pin coupling feature removably couples, using the actuator, to the at least one second actuator assembly coupling feature of the pin. The actuator can couple the at least one docking receptacle coupling feature to the at least one first actuator assembly coupling feature of the second mounting adapter and couples the at least one pin coupling feature to the at least one second actuator assembly coupling feature of the pin while under water during the subsea field operation.

In another aspect, the disclosure can generally relate to an actuator assembly for a subsea remotely operated lifting shackle for use in a subsea field operation. The actuator assembly can include an actuator body and an actuator coupled to the actuator body. The actuator assembly can also include at least one docking receptacle coupling feature operatively controlled by the actuator, where the at least one docking receptacle coupling feature removably couples, using the actuator, to at least one first actuator assembly coupling feature of a mounting adapter of the lifting shackle. The actuator assembly can further include at least one pin coupling feature operatively controlled by the actuator, where the at least one pin coupling feature removably couples, using the actuator, to at least one second actuator assembly coupling feature of the mounting adapter of the lifting shackle. The actuator can couple the at least one docking receptacle coupling feature to the at least one first actuator assembly coupling feature of the mounting adapter and the at least one pin coupling feature to the at least one second actuator assembly coupling feature of the mounting adapter while under water during the subsea field operation.

In yet another aspect, the disclosure can generally relate to a method for assembling a lifting shackle for use in an operation in a subsea field. The method can include positioning, while under water in the subsea field, an actuator assembly proximate to a docking receptacle of a mounting adapter, where the mounting adapter is coupled to a shackle body of the lifting shackle. The method can also include coupling, using an actuator of the actuator assembly while under the water, at least one pin coupling feature of the actuator assembly to at least one first actuator assembly coupling feature of a pin of the lifting shackle, where the pin is disposed in a channel of the mounting adapter, a first aperture of the shackle body, and a second aperture of the shackle body. The method can further include coupling, when coupling the at least one pin coupling feature of the actuator assembly to the at least one first actuator assembly coupling feature of the pin, at least one docking receptacle coupling feature of the actuator assembly to at least one second actuator assembly coupling feature of the docking receptacle using the actuator of the actuator assembly while under the water. The method can also include removing the pin from the shackle body using the actuator assembly.

These and other aspects, objects, features, and embodiments will be apparent from the following description and the appended claims.

BRIEF DESCRIPTION OF THE DRAWINGS

The drawings illustrate only example embodiments of methods, systems, and devices for a lifting shackle and are therefore not to be considered limiting of its scope, as lifting shackles may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 2:
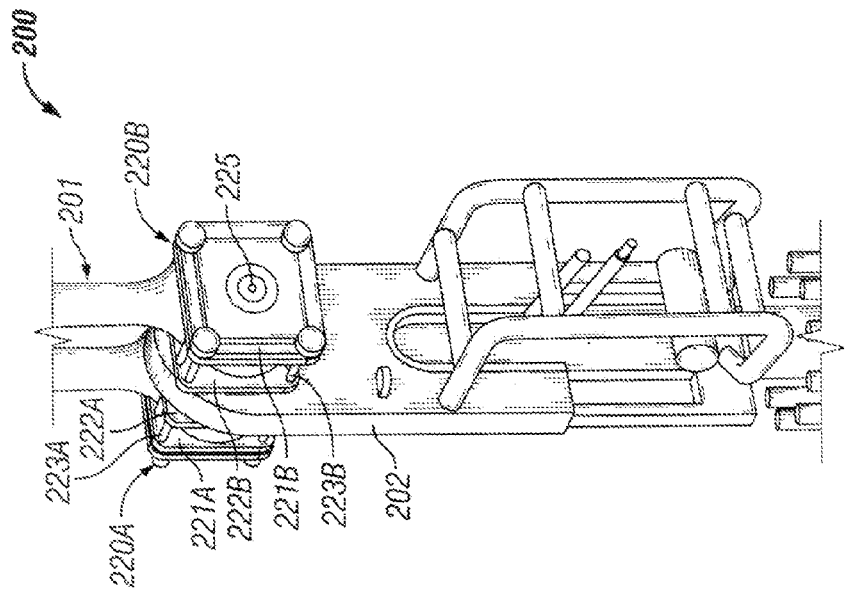
FIG. 2 shows a pair of mounting frames of a lifting shackle in accordance with current practices in the art.
Figure 1:
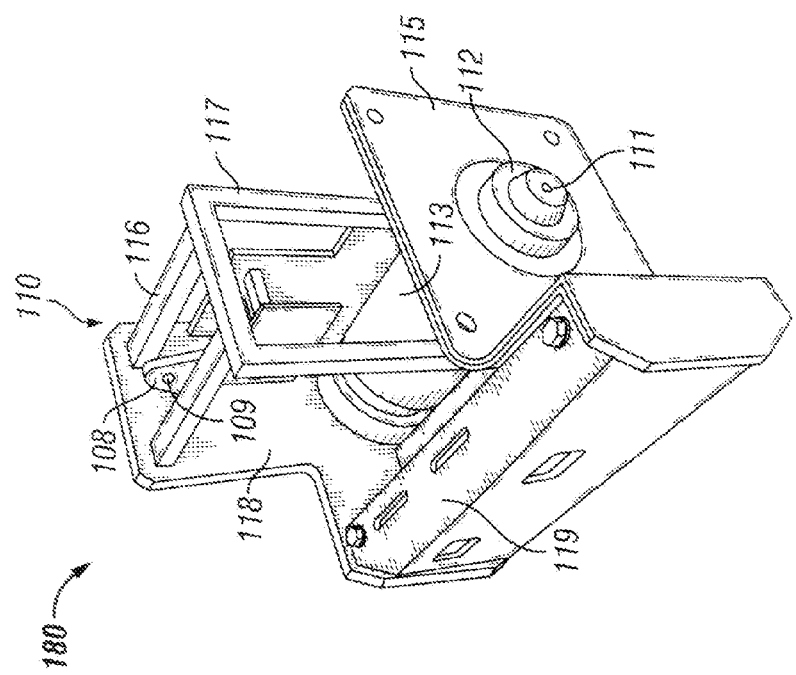
FIG. 1 shows an actuator assembly of a lifting shackle in accordance with current practices in the art.

The example embodiments discussed herein are directed to systems, apparatuses, and methods of lifting shackles. While the example lifting shackles described herein are directed toward subsea field operations, example lifting shackles are not limited to subsea field operations. Examples of other applications that can be used with example lifting shackles can include, but are not limited to, land-based field operations, above sea-level operations, and industrial operations. A user as described herein may be any person that is involved with lifting shackles. Examples of a user may include, but are not limited to, a crane operator, a roughneck, a company representative, a drilling engineer, a tool pusher, a service hand, a field engineer, an electrician, a mechanic, an operator, a consultant, a contractor, and a manufacturer's representative.

Any example lifting shackles, or portions (e.g., components) thereof, described herein can be made from a single piece (as from a mold). When an example lifting shackle or portion thereof is made from a single piece, the single piece can be cut out, bent, stamped, and/or otherwise shaped to create certain features, elements, or other portions of a component. Alternatively, an example lifting shackle (or portions thereof) can be made from multiple pieces that are mechanically coupled to each other. In such a case, the multiple pieces can be mechanically coupled to each other using one or more of a number of coupling methods, including but not limited to adhesives, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, fasten, and/or perform other functions aside from merely coupling. In addition, each component and/or feature described herein (including each component of an example lifting shackle) can be made of one or more of a number of suitable materials, including but not limited to metal, ceramic, rubber, and plastic.

A coupling feature (including a complementary coupling feature) as described herein can allow one or more components and/or portions of an example lifting shackle to become mechanically coupled, directly or indirectly, to another portion of the lifting shackle. A coupling feature can include, but is not limited to, portion of a hinge, an aperture, a recessed area, a protrusion, a slot, a spring clip, a tab, a detent, and mating threads. One portion of an example lifting shackle can be coupled to another portion of a lifting shackle by the direct use of one or more coupling features.

In addition, or in the alternative, a portion of an example lifting shackle can be coupled to another portion of the lifting shackle using one or more independent devices that interact with one or more coupling features disposed on a component of the lifting shackle. Examples of such devices can include, but are not limited to, a pin, a hinge, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature.

Example embodiments of lifting shackles will be described more fully hereinafter with reference to the accompanying drawings, in which example embodiments of lifting shackles are shown. Lifting shackles may, however, be embodied in many different forms and should not be construed as limited to the example embodiments set forth herein. Rather, these example embodiments are provided so that this disclosure will be thorough and complete, and will fully convey the scope of lifting shackles to those of ordinary skill in the art. Like, but not necessarily the same, elements (also sometimes called components) in the various figures are denoted by like reference numerals for consistency.

Terms such as "first," "second," "top," "bottom," "inner," "outer," and "side" are used merely to distinguish one component (or part of a component or state of a component) from another. Such terms are not meant to denote a preference or a particular orientation, and are not meant to limit embodiments of lifting shackles. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIGS. 1-5C show various aspects of utilization of a lifting shackle during a field operation in accordance with current practices in the art. Specifically, FIGS. 1-5C show the components of the lifting shackle and how, in the current art, the lifting shackle is assembled and/or disassembled on an offshore rig and subsea during a field operation. As will be described below, this process can be dangerous and time-consuming. By contrast, as shown in FIGS. 6A-8 below, example embodiments reduce the time required to assembly/disassemble the lifting shackle, and eliminates the safety risk of performing these acts.

Referring to FIGS. 1-5C, FIG. 1 shows an actuator assembly 180 of a lifting shackle in accordance with current practices in the art. Specifically, the actuator assembly 180 includes an actuator body 110 that includes a housing 113 that encases a shackle pin engagement rod 111 and a thread protector 112 that protects the threads on the shackle pin engagement rod 111. The actuator body 110 includes a number of features and/or components, such as a front plate 115, a rear plate 118, an actuator housing 119, at least one front support 117, at least one top support 116, and a lifting feature 108 (in this case, disposed on one of the top supports 116 and having an aperture 109 traverse therethrough).

FIG. 2 shows a subassembly 200 of a lifting shackle in accordance with current practices in the art. The subassembly 200 includes a shackle body 201, two shackle frames (shackle frame 220A and shackle frame 220B), and a pin 225 of the lifting shackle. The subassembly 200 also includes equipment 202 coupled to the pin 225 and disposed between the shackle body 201 and the shackle frames. As will be shown below with respect to FIG. 3, the shackle body 201 has two ends, where each end is surrounded by a shackle frame. Specifically, shackle frame 220A has an inner plate 222A that is disposed on an inner surface of the end of the shackle body 201, an outer plate 221A that is disposed on an outer surface of the end of the shackle body 201, and a number of fastening devices 223A that couple the inner plate 222A to the outer plate 221A.

Similarly, shackle frame 220B has an inner plate 222B that is disposed on an inner surface of the other end of the shackle body 201, an outer plate 221B that is disposed on an outer surface of the other end of the shackle body 201, and a number of fastening devices 223B that couple the inner plate 222B to the outer plate 221B. The pin 225 traverses a channel (hidden from view by the pin 225) in the shackle frame 220B, a channel in the shackle frame 220A, and an aperture in both ends of the shackle body 201. When the equipment 202 is coupled to the lifting shackle, the pin 225 also traverses an aperture in the equipment 202. When the pin 255 is so disposed as to be accessible to, or coupled with, the actuator assembly 180, the pin 225 is said to be in an engaged position. Otherwise, the pin 225 is said to be in a disengaged position.

Figure 3:
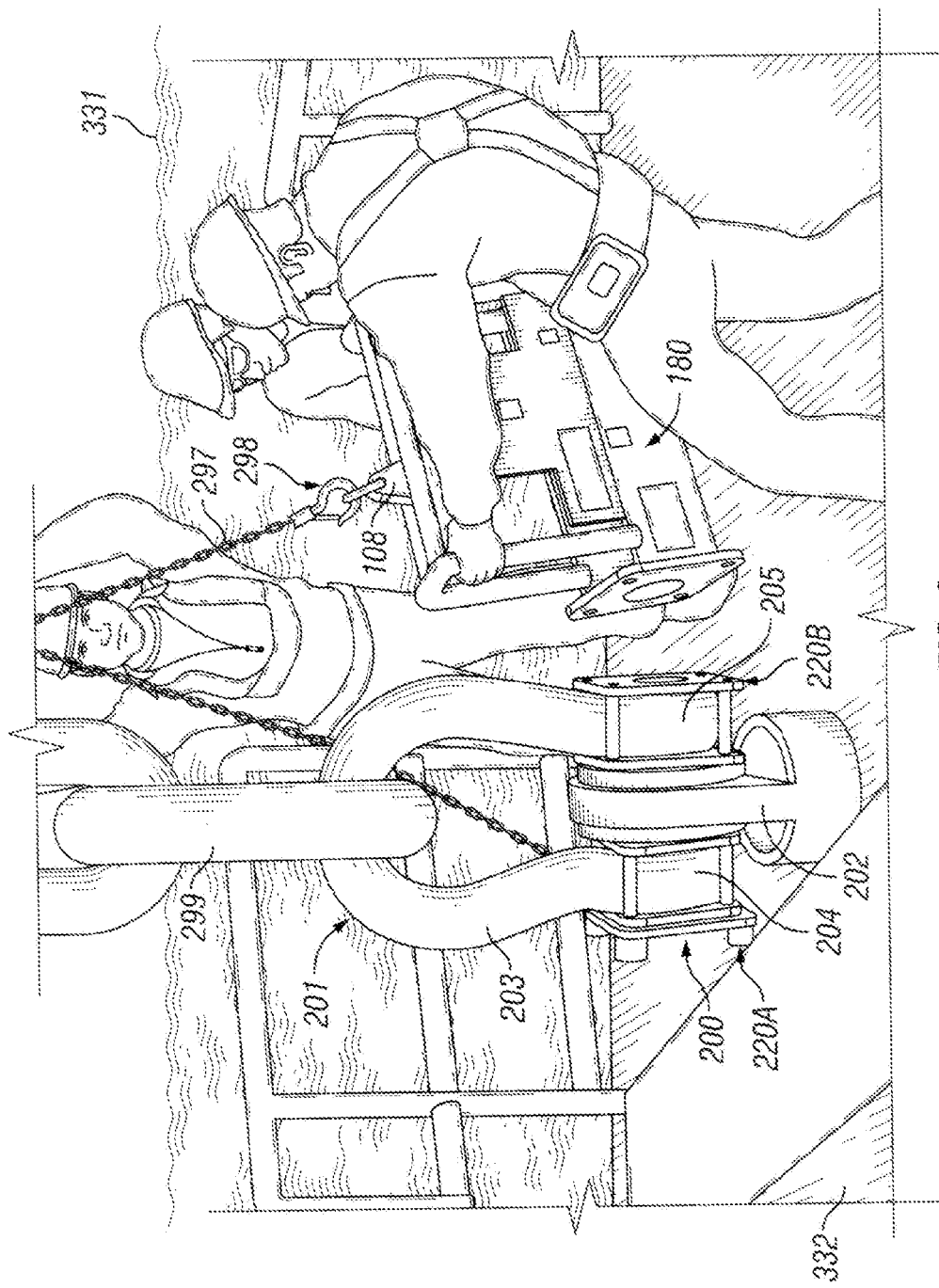
FIGS. 3 and 4 show lifting shackles in accordance with current practices in the art.

To lock the pin 225 in place within the channel in the shackle frame 220B, the channel in the shackle frame 220A, the aperture in both ends of the shackle body 201, and the aperture in the equipment 202, the actuator assembly 180 becomes engaged with the pin 225, as shown in the subassembly 300 of FIG. 3. Specifically, the shackle pin engagement rod 111 becomes threadably coupled with the pin 225, often using mechanical means (e.g., large wrench) and a rotational force. To accomplish this coupling between the shackle pin engagement rod 111 and the pin 225, as shown in FIG. 3, the actuator assembly 180 must become aligned with the pin 225. In this case, the actuator assembly 180 is being coupled to the pin 225 on a construction vessel 332 above the water level 331.

Since the size and weight of the various components (e.g., shackle body 201, the pin 225, the actuator assembly 180) of the lifting shackle and the equipment 202 are so great, several people and multiple mechanical lifting devices are required. For example, a lifting device (e.g., a crane) can be used, along with a chain 297 that ends in a hook 298 that traverses the aperture 109 in the lifting feature 108 of the actuator assembly 180, to lift and position the actuator assembly 180.

Figure 4:
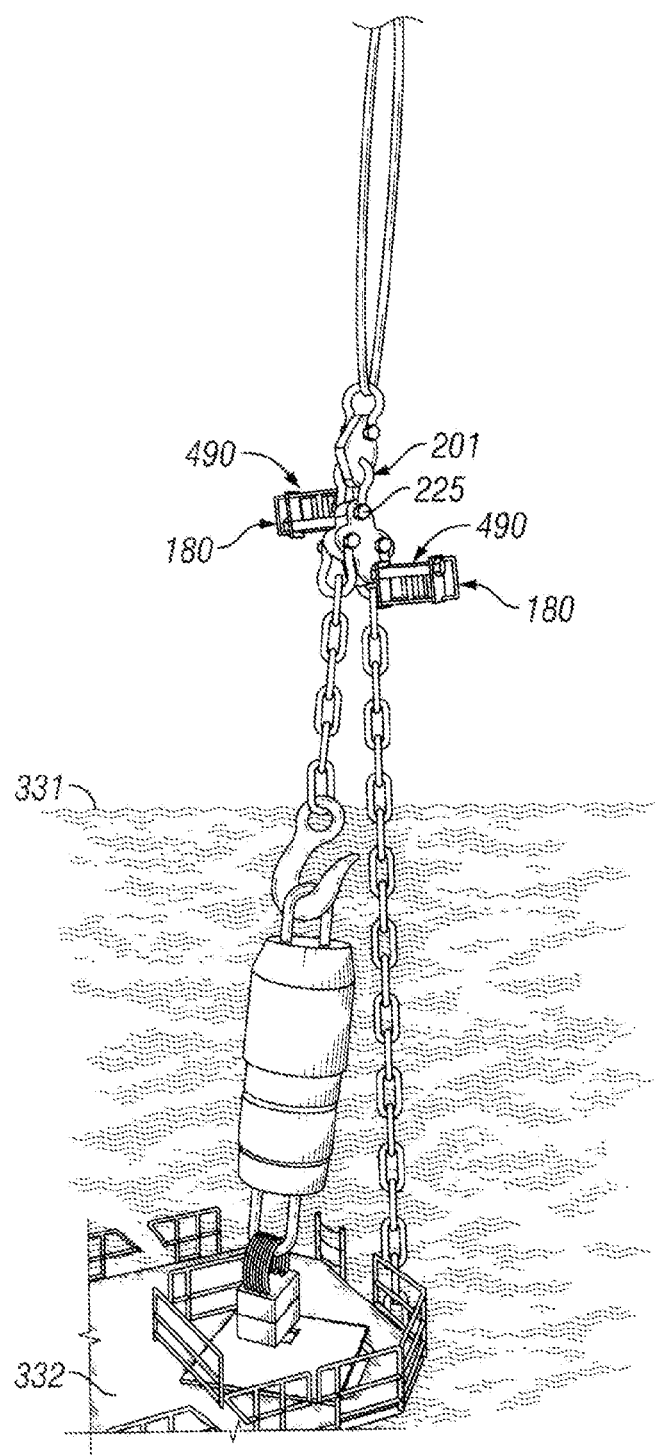

As another example, a different, much larger lifting device is used with the subassembly 200 of FIG. 2, along with a chain 299 having a link coupled to the open loop section 203 of the shackle body 201, to lift and position the subassembly 200 (and, more specifically, the pin 225). In this case, an extreme safety hazard exists because of the weight of this suspended load and the fact that multiple people must work under this suspended load to properly position the actuator assembly 180. Example embodiments are designed to reduce or eliminate this risk to personnel, as shown below. FIG. 3 also shows more clearly the shackle body 201. Specifically, end 204 of the shackle body 201 is shown surrounded by shackle frame 220A, and end 205 of the shackle body 201 is shown surrounded by shackle frame 220B. FIG. 4 shows a subassembly 400 that includes two lifting shackles 490 that are fully assembled above the water level 331 on the offshore rig 332.

When a lifting shackle (e.g., lifting shackle 490) is fully assembled and engaged with one or more pieces of equipment (e.g., equipment 202) as part of a field operation, the resulting assembly (e.g., assembly 500 of FIGS. 5A-5C) remains assembled, often for very extended periods of time (e.g., weeks, months). When the field operation is an offshore field operation conducted above the water level, the assembly can be exposed to moisture, dirt, salt water, corrosion, and/or other conditions that can affect the integrity of the actuator assembly 180 and the other components (e.g., the pin 225) of the lifting shackle 490, making the eventual decoupling of the actuator assembly 180 from the rest of the lifting shackle 490 difficult. This is especially true because, in many cases, the shackle is "wet stored" (attached to a piece of equipment) subsea for substantial periods of time (e.g., months, years).

When the field operation in which the lifting shackle 490 is used is a subsea field operation, the process of coupling the actuator assembly 180 to and/or decoupling the actuator assembly 180 from the rest of the lifting shackle 490 can be more problematic. For one thing, access is significantly difficult. The equipment 202 needs to be coupled to and/or decoupled from the remainder of the lifting shackle 490 is often located at or near the seabed, which can be hundreds if not thousands of feet below the water level 331. As a result, human divers and/or a remotely-operated underwater vehicle (ROV) must be used to assemble and/or disassemble the lifting shackle 490 under water, or the lifting shackle 490 and equipment are lifted to the construction vessel 332 above the water level 331 for easier access. In either case, the process is very time consuming (which translates to high costs) and extremely dangerous for personnel working with the lifting shackle 490.

Further, the equipment (e.g., risers, pipelines) can be damaged when they are lifted off the sea floor to the offshore rig 332 and subsequently placed back in the water near the seabed. In some cases, an actuator assembly 180 currently used in the art is permanently integrated with the rest of the lifting shackle 490, and so no coupling and decoupling of the actuator assembly 180 is required. However, integrated actuator shackles 180 have a high risk of losing seal integrity, allowing critical parts of the lifting shackle 490 to be exposed to salt water for long periods of time. This can result in mechanical damage while stored under water.

Figure 5A:
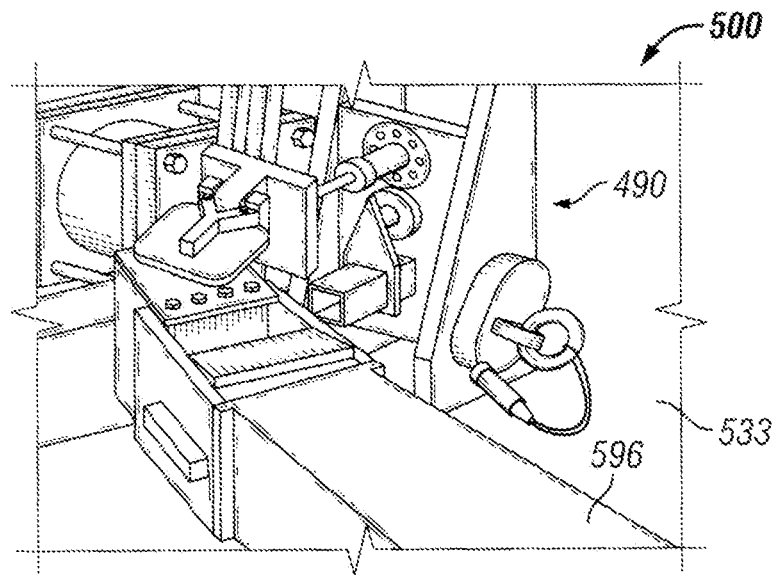
FIGS. 5A-5C show various views of a lifting shackle being removed subsea in accordance with current practices in the art.
Figure 5B:
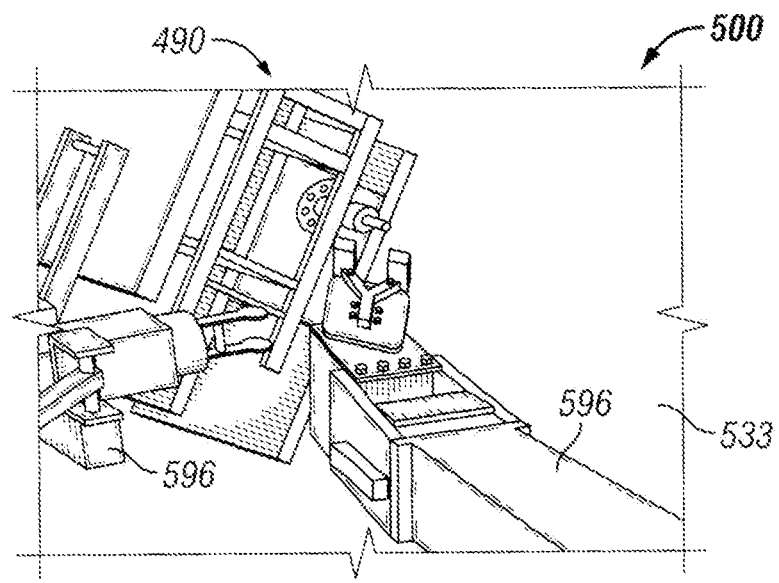
Figure 5C:
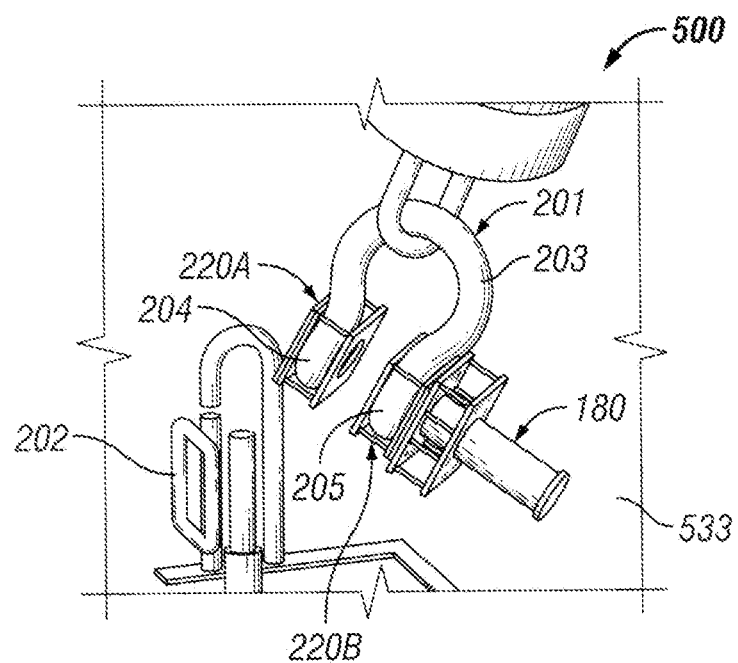

FIGS. 5A-5C show a subassembly 500 of an assembled lifting shackle 490 currently used in the art being disassembled under water 533. Through the use of one or more ROVs 596, the lifting shackle 490, once disassembled (in this case, once the pin is removed from the rest of the lifting shackle 490), is disengaged from the equipment 202 and lifted above the water level 331 to the construction vessel 332 or an offshore rig. As stated above, the pin is threadably coupled to the actuator assembly 180, and so the actuator assembly 180 uses a rotational force to become decoupled from the pin. If the lifting shackle 490 is left under water 533 for a significant amount of time, or if the seals on the lifting shackle 490 fail, the salt water can corrode the mating threads on the pin and the actuator assembly 180, causing them to bind.

Figure 6A:
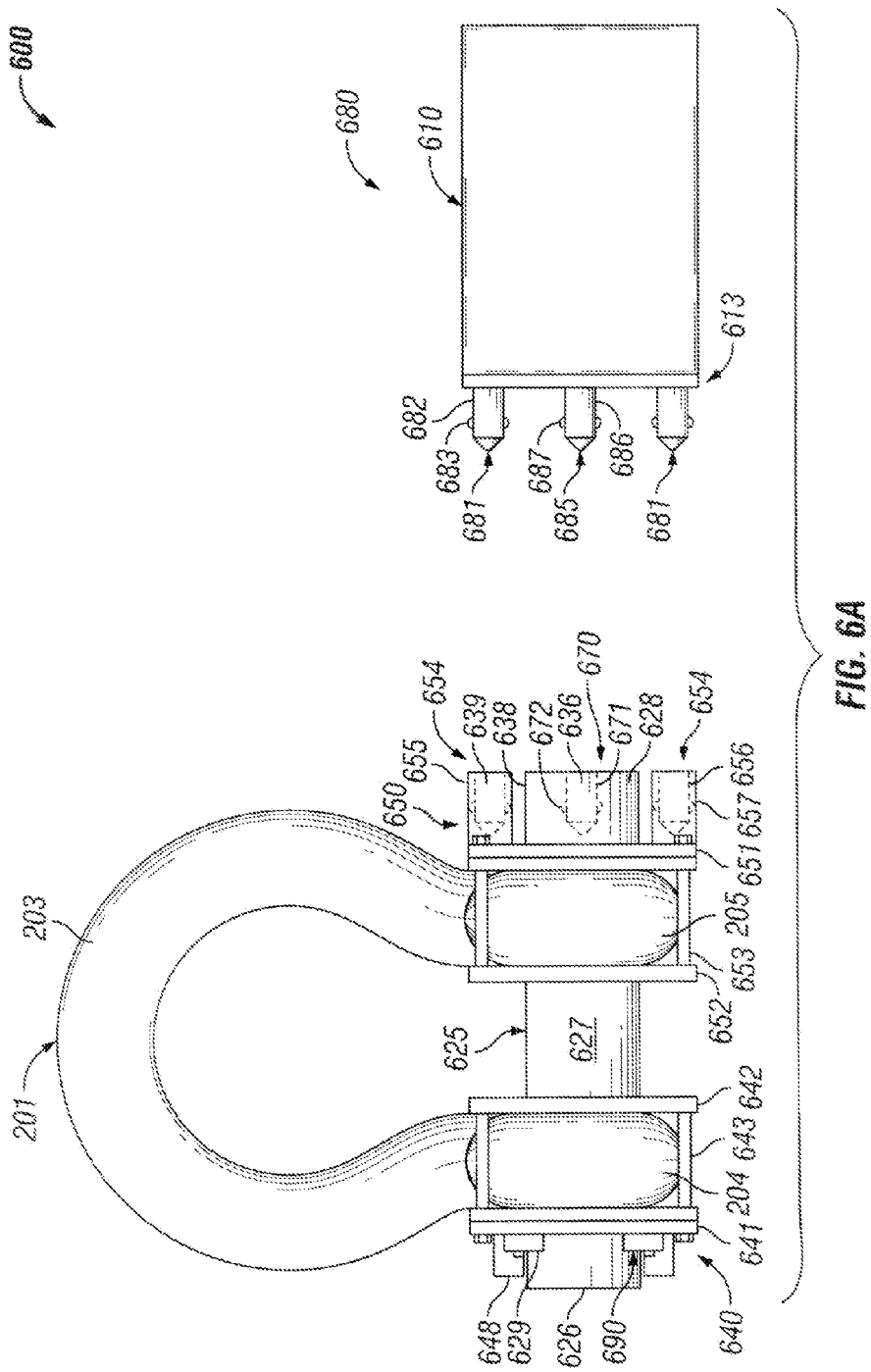
FIGS. 6A-6C show various views of a lifting shackle in accordance with certain example embodiments.
Figure 6C:
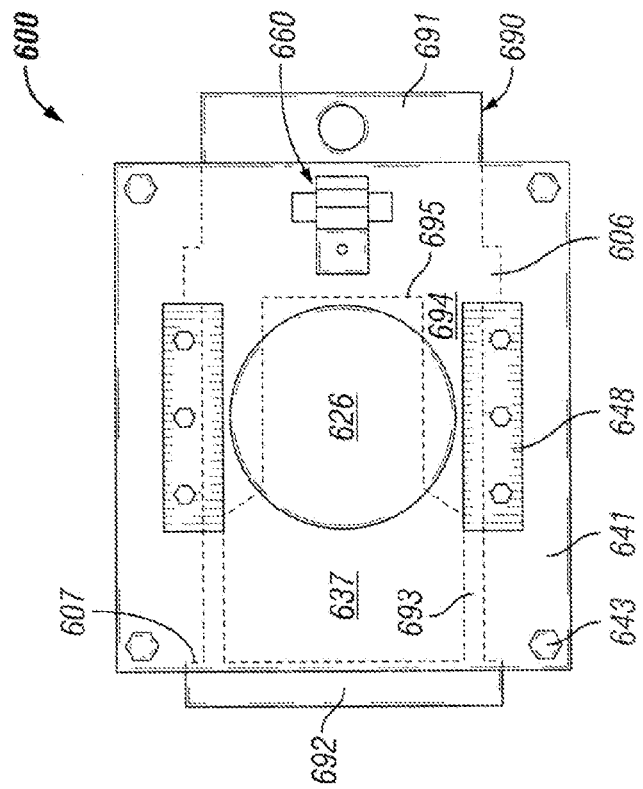
Figure 6B:
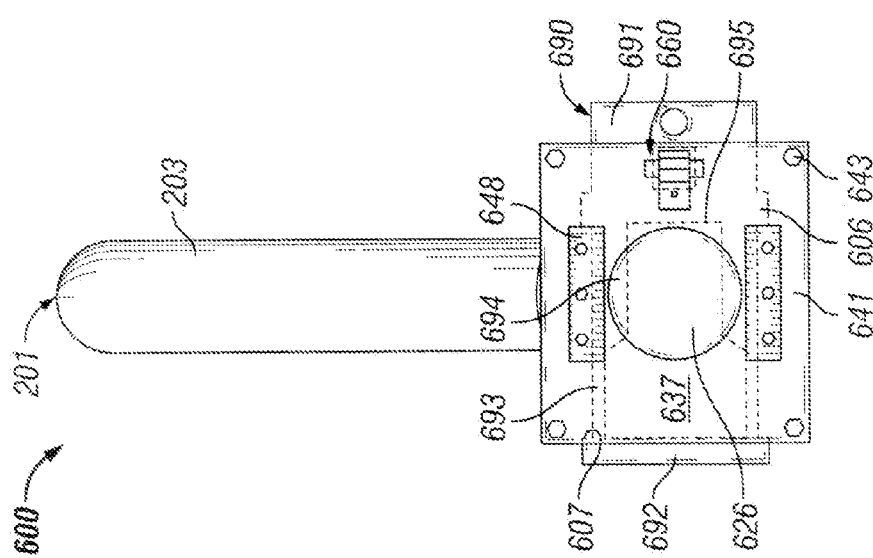

FIGS. 6A-6C show various views of a lifting shackle 600 in accordance with certain example embodiments. Specifically, FIG. 6A shows a partially-exploded front view of the lifting shackle 600. FIG. 6B shows a side view of the lifting shackle 600. FIG. 6C shows a detailed view of a portion of the lifting shackle 600. In one or more embodiments, one or more of the features shown in FIGS. 6A-6C may be omitted, added, repeated, and/or substituted. Accordingly, embodiments of a lifting shackle should not be considered limited to the specific arrangements of components shown in FIGS. 6A-6C.

Referring to FIGS. 1-6C, the shackle body 201 is substantially the same as the shackle body described above with respect to FIGS. 1-5C. Further, in some cases, the mounting adapter 640 that is disposed over the end 204 of the shackle body 201 can be substantially the same as the shackle frame 220A of FIGS. 1-5C above. Alternatively, the mounting adapter 640 can include one or more different and/or additional features compared to the shackle frame 220A currently used in the art. For example, while the mounting adapter 640 can include an inner plate 642 (similar to the inner plate 222A) that is disposed on an inner surface of the end 204 of the shackle body 201, an outer plate 641 (similar to the outer plate 221A) that is disposed on an outer surface of the end 204 of the shackle body 201, and a number of fastening devices 643 (similar to the fastening devices 223A) that couple the inner plate 642 to the outer plate 641. The mounting adapter 640 can also form a channel that aligns with the aperture in the end 204 of the shackle body 201.

In addition, certain embodiments of the mounting adapter 640 include one or more features that help secure the pin 625. For example, as shown in FIGS. 6A-6C, the mounting adapter 640 can include at least one guiding feature 648 and a retention plate 690. There can be any number (in this case, two) of guiding features 648. If there are multiple guiding features 648, each one can be substantially the same as, or different than, one or more of the other guiding features 648. The guiding features 648 are designed to retain the retention plate 690 within a range of motion. The guiding features 648 in this case are disposed on the outer surface of the outer plate 641, but can be positioned at any other location on the mounting adapter 640.

In certain example embodiments, the retention plate 690 is slidably disposed within the guiding features 648. The retention plate 690 can include one or more of a number of features. For example, as shown in FIGS. 6B and 6C, the retention plate 690 can include a distal end 692 having at least one stop 607, a proximal end 691, side elements 693 and an inner edge 695 that forms a channel 637, and protrusions 694 from the side elements 693 that narrow the width of the channel 637. One or more additional stops 606 can be disposed in line with where the inner edge 695 is located.

The width of the retention plate 690 can be less than the width of the portion of the guiding features 648 that couple to the outer plate 641, which allows the retention plate 690 to slide relative to the guiding features 648. The overhang portions of the guiding features 648 also act as a boundary to prevent the retention plate 690 from decoupling from the guiding features 648. The stops 606 and the stops 607 can extend outward to such an extent that the width of the retention plate 690 at the stops is greater than the portion of the guiding features 648 that couple to the outer plate 641. As a result, the stops 606 prevent the retention plate 690 from sliding in a further distal direction relative to the guiding features 648, and the stops 607 prevent the retention plate 690 from sliding in a further proximal direction relative to the guiding features 648.

The channel 637 formed by the protrusions 694 of the retention plate 690 can have a width that is less than the width of the proximal end 626 of the pin 625 and greater than the width of a retention feature 629, positioned adjacent to the proximal end 626 of the pin 625. In addition, the channel 637 formed by the side elements 693 of the retention plate 690 can have a width that is greater than the width of the proximal end 626 of the pin 625 and greater than the width of the channel 637 formed by the protrusions 694.

In this way, when the retention plate 690 slides within the guiding features 648 distally (toward the proximal end 626 of the pin 625), the protrusions 694 of the retention plate 690 engage (become coupled to) the retention feature 629 of the pin 625. Conversely, when the retention plate 690 slides within the guiding features 648 proximally (away from the proximal end 626 of the pin 625), the protrusions 694 of the retention plate 690 are disengaged with (become decoupled from) the retention feature 629 of the pin 625, which allows the pin 625 (absent any other coupling force applied to the pin 625) to move within the channels of the mounting adapter 640 and the mounting adapter 650, as well as the apertures of the end 204 and the end 205 of the shackle body 201. In certain example embodiments, the retention feature 629 of the pin 625 is only accessible to the protrusions 694 of the retention plate 690 when the pin 625 is in the engaged position.

In certain example embodiments, the retention plate 690 also includes one or more features to lock the retention plate 690 in place when the retention plate 690 is engaged with (coupled to) the pin 625. For example, as shown in FIGS. 6B and 6C, the retention plate 690 can include a locking feature 660. The locking feature 660 can couple to the outer plate 641 and/or another portion of the mounting adapter 640 when the retention plate 690 is in a certain position relative to the outer plate 641 and/or other portion of the mounting adapter 640. In this case, the locking feature 660 couples to the outer plate 641 when the retention plate 690 is fully engaged with the retention feature 629 of the pin 625.

The locking feature 660 can act as a back-up locking mechanism to maintain the coupling between the retention plate 690 and a portion of the mounting adapter 640. The locking feature 660 can become engaged automatically (as with detents or tabs), manually (as with a pushbutton or latch), hydraulically, and/or using a separate component (as by inserting a pin into an aperture in the locking feature 660 and an aligned aperture in the outer plate 641). Similarly, the locking feature 660 can become disengaged automatically, manually, hydraulically, and/or using a separate component. In certain example embodiments, the mounting adapter 640 can have one or more additional and/or alternative features. For example, the mounting adapter 640 can be configured substantially similar to (but the mirror image of) the mounting adapter 650, described below.

The lifting shackle 600 can also include another mounting adapter 650 that is disposed over the end 205 of the shackle body 201. The mounting adapter 650 can be substantially the same as the shackle frame 220B of FIGS. 1-5C above. Alternatively, the mounting adapter 650 can include one or more different and/or additional features compared to the shackle frame 220B currently used in the art. For example, while the mounting adapter 650 can include an inner plate 652 (similar to the inner plate 222B) that is disposed on an inner surface of the end 205 of the shackle body 201, an outer plate 651 (similar to the outer plate 221B) that is disposed on an outer surface of the end 205 of the shackle body 201, and a number of fastening devices 653 (similar to the fastening devices 223B) that couple the inner plate 652 to the outer plate 651. The inner plate 652, the outer plate 651, and the fastening devices 653 can be referred to as the frame of the mounting adapter 650. The mounting adapter 650 can also form a channel that aligns with the aperture in the end 205 of the shackle body 201.

In addition to the frame, certain embodiments of the mounting adapter 650 include one or more features that help secure the actuator assembly 680 to the mounting adapter 650. For example, as shown in FIG. 6A, the mounting adapter 650 can include a docking receptacle 655 coupled to the frame of the mounting adapter 650. In such a case, the docking receptacle 655 can include at least one actuator assembly coupling feature 654 (in this case, four) and a channel 638 that traverses through the docking receptacle 655, where the channel 638 aligns with the aperture in the end 205.

In certain example embodiments, each actuator assembly coupling feature 654 is configured to couple to a corresponding docking receptacle coupling feature 681, described below, of the actuator assembly 680. In other words, the configuration (e.g., features, size, shape) of an actuator assembly coupling feature 654 complements the configuration of a docking receptacle coupling feature 681 to which the actuator assembly coupling feature 654 couples. In this case, each actuator assembly coupling feature 654 has a female configuration that includes a cavity 639 bounded by a wall 656. One or more recesses 657 can be disposed within the wall 656 to expand the cavity 639 in those locations.

One or more portions (e.g., the docking receptacle 655) of the mounting adapter 650 can include one or more features to lock the coupling between the docking receptacle coupling feature 681 and the actuator assembly coupling feature 654. While not shown in FIGS. 6A-6C, such features can act as a back-up locking mechanism to maintain the coupling between the docking receptacle coupling feature 681 and the actuator assembly coupling feature 654. Such a feature can become engaged and/or disengaged automatically, manually, hydraulically, and/or using a separate component.

As with the pin 225 of FIGS. 2-5C, the pin 625 of the lifting shackle 600 of FIGS. 6A-6C can be disposed within the channels of the mounting adapter 640 and the mounting adapter 650, as well as the apertures of the end 204 and the end 205 of the shackle body 201, when the pin 625 is in the engaged position. As described above, the pin 625 can include a retention feature 629, positioned adjacent to the proximal end 626. The pin 625 can also have a middle portion 627 and a distal end 628.

In certain example embodiments, the distal end 628 of the pin 625 includes one or more features that help secure the actuator assembly 680 to the pin 625. For example, as shown in FIG. 6A, distal end 628 of the pin 625 can include at least one actuator assembly coupling feature 670 (in this case, one). Each actuator assembly coupling feature 654 can be configured to couple to a corresponding pin coupling feature 685, described below, of the actuator assembly 680. In other words, the configuration (e.g., features, size, shape) of an actuator assembly coupling feature 670 complements the configuration of a pin coupling feature 685 to which the actuator assembly coupling feature 670 couples. In this case, each actuator assembly coupling feature 670 has a female configuration that includes a cavity 636 bounded by a wall 671. One or more recesses 672 can be disposed within the wall 671 to expand the cavity 636 in those locations.

One or more portions of the pin 625 can include one or more features to lock the coupling between the pin coupling feature 685 and the actuator assembly coupling feature 670. While not shown in FIGS. 6A-6C, such features can act as a back-up locking mechanism to maintain the coupling between the pin coupling feature 685 and the actuator assembly coupling feature 670. Such a feature can become engaged and/or disengaged automatically, manually, hydraulically, and/or using a separate component.

The actuator assembly 680 of the lifting shackle 600 can include an actuator body 610, which can be substantially the same as the actuator body 110 described above. The actuator 613 of the actuator assembly 680 can have one or more of a number of different and/or additional features compared to the actuator (located inside the actuator housing 119) described above. The actuator 613 in this case provides a force (e.g., hydraulic, magnetic, electrical) that drives one or more of the docking receptacle coupling features 681 and one or more of the pin coupling features 685, both described below.

Thus, the actuator 613 is operatively coupled to each docking receptacle coupling feature 681 and each pin coupling feature 685. The actuator 613 can control each docking receptacle coupling feature 681 individually, as a subgroup, or as a group. Similarly, the actuator 613 can control each pin coupling feature 685 individually, as a subgroup, or as a group. The actuator 613 can control the one or more docking receptacle coupling features 681 independently of, or in conjunction with, the one or more pin coupling features 685.

In certain example embodiments, the actuator assembly 680 is removably coupled to the docking receptacle 655 of the mounting adapter 650 and to the pin 625. Specifically, the actuator assembly 680 can include one or more docking receptacle coupling features 681 and one or more pin coupling features 685. As discussed above, each docking receptacle coupling feature 681 is configured to be removably coupled to a actuator assembly coupling feature 654 of the mounting adapter 650. Specifically, the configuration (e.g., features, size, shape) of a docking receptacle coupling feature 681 complements the configuration of an actuator assembly coupling feature 654 to which the docking receptacle coupling feature 681 couples. In this case, each docking receptacle coupling feature 681 has a male configuration that includes a body 682 that includes one or more retractable protrusions 683. The body 682 fits within the cavity 639 of the actuator assembly coupling feature 654, and each retractable protrusion 683 can, when in a protruding position, be disposed within a recess 657 of the actuator assembly coupling feature 654.

Similarly, each pin coupling feature 685 is configured to be removably coupled to an actuator assembly coupling feature 670 of the pin 625. Specifically, the configuration (e.g., features, size, shape) of a pin coupling feature 685 complements the configuration of an actuator assembly coupling feature 670 to which the pin coupling feature 685 couples. In this case, each pin coupling feature 685 has a male configuration that includes a body 686 that includes one or more retractable protrusions 687. The body 686 fits within the cavity 636 of the actuator assembly coupling feature 670, and each retractable protrusion 687 can, when in a protruding position, be disposed within a recess 672 of the actuator assembly coupling feature 670.

Figure 7A:
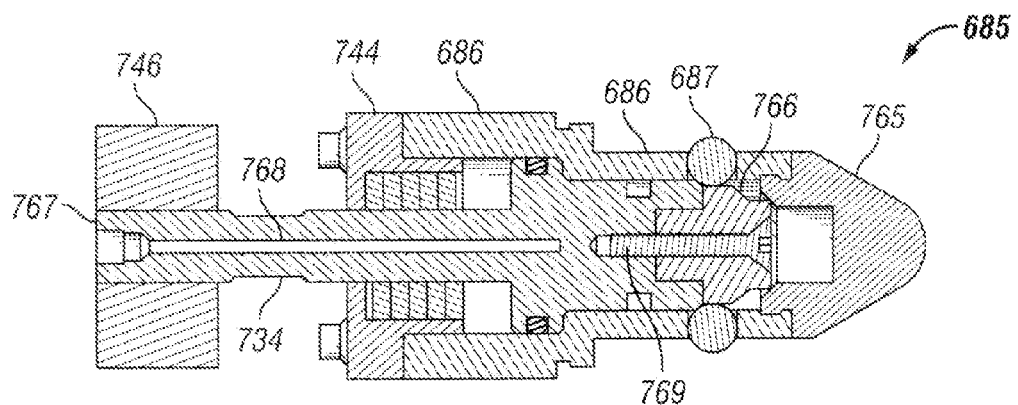
FIGS. 7A and 7B show various views of a coupling feature of an actuator assembly in accordance with certain example embodiments.
Figure 7B:
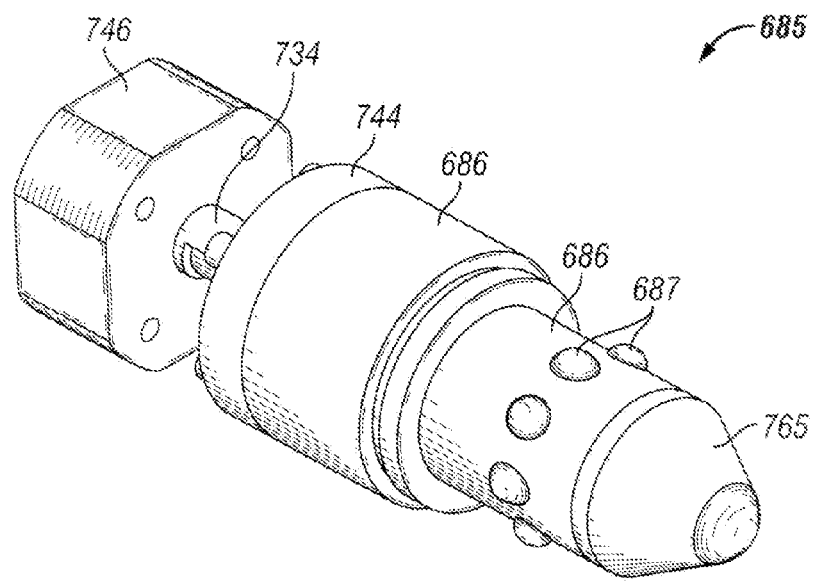

FIGS. 7A and 7B show a cross-sectional side view and a perspective view, respectively, of a coupling feature (in this case, a pin coupling feature 685) of an actuator assembly in accordance with certain example embodiments. In one or more embodiments, one or more of the features shown in FIGS. 7A and 7B may be omitted, added, repeated, and/or substituted. Accordingly, embodiments of a coupling feature should not be considered limited to the specific arrangements of components shown in FIGS. 7A and 7B. For example, the coupling feature shown and described can be a pin coupling feature 685, a docking receptacle coupling feature 681, an actuator assembly coupling feature 654, and/or an actuator assembly coupling feature 670.

Referring to FIGS. 1-7B, the pin coupling feature 685 has a male configuration and can include one or more features that control and/or maintain the position of the retractable protrusions 687. For example, inside of the body 686 can be disposed an inner shell 734, a channel 768 disposed within the inner shell 734, a retention feature 766, and a retention actuator 769 that positions the retention feature 766. If a hydraulic system is used, the hydraulic medium (e.g., fluid) can be disposed in the channel 768 through a connector 767 at the proximal end of the inner shell 734. The retention actuator 769 can be pushed outward (toward the distal end of the inner shell 734) when the hydraulic system is pressurized.

When this occurs, the retention feature 766 pushes the retractable protrusions 687 outward, which causes the retractable protrusions 687 to be disposed within (couple to) the recesses 672 of the actuator assembly coupling feature 670. As long as the medium within the channel 768 remains pressurized, the retention feature 766 maintains the retractable protrusions 687 in a protruding position. When the medium within the channel 768 is no longer pressurized, the retention actuator 769 is forced toward the proximal end of the inner shell 734, which in turn forces the retention feature 766 toward the proximal end of the inner shell 734. When this occurs, the retractable protrusions 687 return to a retracted position, which causes the retractable protrusions 687 to disengage from (decouple from) the recesses 672 of the actuator assembly coupling feature 670.

By using a system such as the one shown and described in FIGS. 6A-7B for coupling the actuator assembly 680 to the pin 625 and/or the docking receptacle 655 of the mounting adapter 650, the actuator assembly 680 can be safely operated under water 533 by a ROV 596 and/or a diver without the need to bring equipment 202 above the water level 331 to a construction vessel 332, saving time and reducing the risk of injury. Further, the actuator assembly 680 can be easily coupled and/or decoupled from the rest of the lifting shackle 600, reducing the risk of corrosion or other failure that can occur when the actuator assembly is left under water 533 for an extended period of time.

The pin coupling feature 685 can also include one or more other features. For example, as shown in FIGS. 7A and 7B, the pin coupling feature 685 can include a tip 765 that abuts the distal end of the body 686, a base 744 that abuts the proximal end of the body 686. As another example, a base 746 can surround the proximal end of the inner shell 734, helping to protect and secure the connector 767. In addition to, or in the alternative of, a hydraulic system, the pin coupling feature 685 can operate using springs, detents, and/or any other method to protrude and/or retract the retractable protrusions 687. In certain example embodiments, the pin 625 (including the actuator assembly coupling feature 670), the mounting adapter 650 (including the actuator assembly coupling feature 654), and the actuator assembly 680 (including the pin coupling feature 685 and the docking receptacle coupling feature 681) are without mating threads.

The hydraulic system and/or other method for manipulating the retractable protrusions 687 of the pin coupling feature 685 can be controlled by the actuator 613. Alternatively, the hydraulic system and/or other method for manipulating the retractable protrusions 687 of the pin coupling feature 685 can be controlled by a user (e.g., a diver, a ROV 596, an engineer on the construction vessel 332 or an offshore rig).

Figure 8:
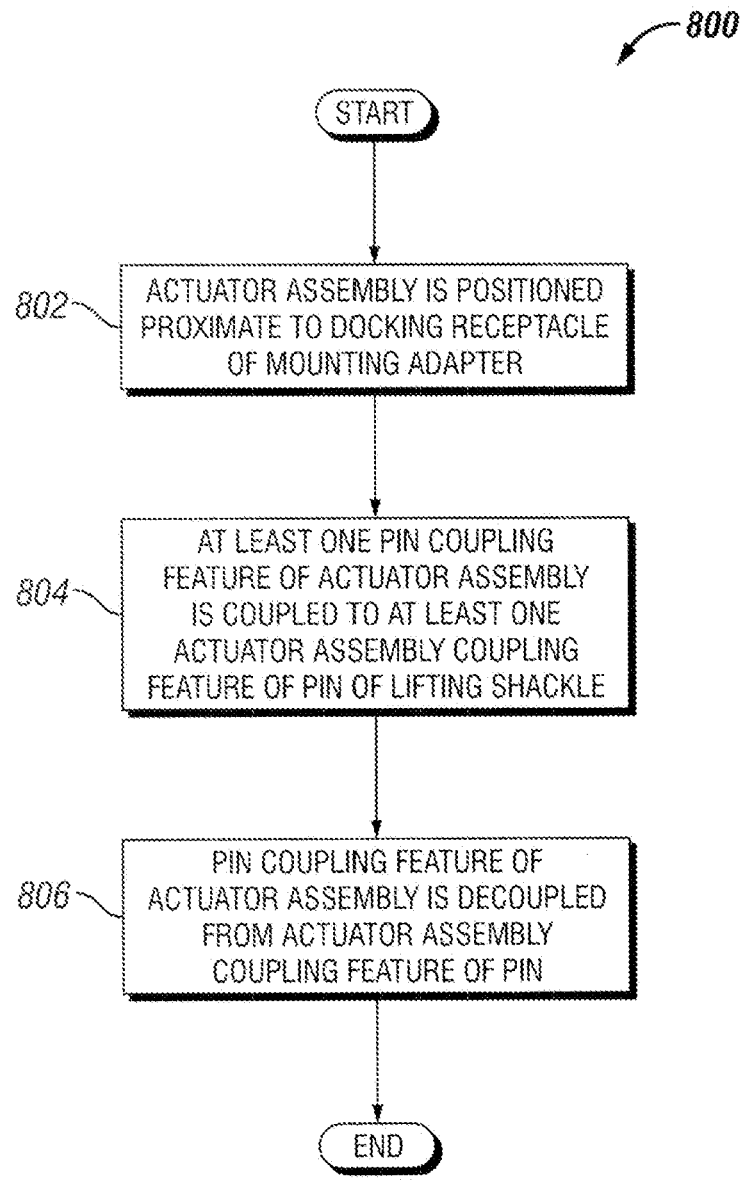
FIG. 8 shows a flowchart of a method for disassembling a lifting shackle for use in an operation in a subsea field in accordance with certain example embodiments.

FIG. 8 shows a flowchart of a method 800 for assembling a lifting shackle 600 for use in an operation in a subsea field. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order. In addition, a person of ordinary skill in the art will appreciate that additional steps not shown in FIG. 8, may be included in performing this method. Accordingly, the specific arrangement of steps should not be construed as limiting the scope.

Referring now to FIGS. 1-8, the example method 800 begins at the START step and proceeds to step 802, where an actuator assembly 680 is positioned proximate to a docking receptacle 655 of a mounting adapter 650. In certain example embodiments, the actuator assembly 680 is positioned proximate to a docking receptacle 655 while under water 533 in the subsea field. The mounting adapter 650 can be coupled to a shackle body 201 of the lifting shackle 600. The actuator assembly 680 can be positioned using a ROV 596, a diver, a lifting device (e.g., mounted on an offshore rig 332 above the water level 331), and/or some other device or means. The pin 625 of the lifting shackle 600 can be positioned to secure the equipment 202 relative to the rest of the lifting shackle 600.

In step 804, at least one pin coupling feature 685 of the actuator assembly 680 is coupled to at least one actuator assembly coupling feature 670 of a pin 625 of the lifting shackle 600. In certain example embodiments, a pin coupling feature 685 of the actuator assembly 680 is coupled to a actuator assembly coupling feature 670 of the pin 625 using an actuator 613 of the actuator assembly 680 while under the water 533. The pin coupling feature 685 can include one or more retractable protrusions 687, which engage one or more recesses 672 of the actuator assembly coupling feature 670. The pin coupling feature 685 can couple to the actuator assembly coupling feature 670 using a hydraulic system, a mechanical system, and/or other method.

The pin coupling feature 685 can couple to the actuator assembly coupling feature 670 using the actuator 613. Alternatively, the hydraulic system and/or other method for coupling the pin coupling feature 685 and the actuator assembly coupling feature 670 can be controlled by a user (e.g., a diver, a ROV 596, an engineer on the offshore rig 332). When a pin coupling feature 685 of the actuator assembly 680 is coupled to a first actuator assembly coupling feature 670 of the pin 625, the pin 625 is disposed in a channel of the mounting adapter 650, an aperture in the end 204 of the shackle body 201, an aperture (or other coupling feature) in the equipment 202, and an aperture in the end 205 of the shackle body 201.

At substantially the same time that step 804 is being performed, step 805 is also performed. In step 805, at least one docking receptacle coupling feature 681 of the actuator assembly 680 is coupled to at least one actuator assembly coupling feature 654 of the docking receptacle 655. In certain example embodiments, docking receptacle coupling feature 681 of the actuator assembly 680 is coupled to at least one actuator assembly coupling feature 654 of the docking receptacle 655 using the actuator 613 of the actuator assembly 680 while under the water 533. The docking receptacle coupling feature 681 can include one or more retractable protrusions 683, which engage one or more recesses 657 of the actuator assembly coupling feature 654. The docking receptacle coupling feature 681 can couple to the actuator assembly coupling feature 654 using a hydraulic system, a mechanical system, and/or other method.

The docking receptacle coupling feature 681 can couple to the actuator assembly coupling feature 654 using the actuator 613. Alternatively, the hydraulic system and/or other method for coupling the docking receptacle coupling feature 681 and the actuator assembly coupling feature 654 can be controlled by a user (e.g., a diver, a ROV 596, an engineer on the offshore rig 332). When a docking receptacle coupling feature 681 of the actuator assembly 680 is coupled to an actuator assembly coupling feature 654 of the mounting adapter 650, the mounting adapter 650 is disposed over the end 205 of the shackle body 201.

Once step 804 and 805 are complete, the method 800 proceeds to step 806. In step 806, the pin 625 is removed from the shackle body 201. Specifically, the pin 625 is removed from the channel of the mounting adapter 650, the aperture in the end 204 of the shackle body 201, and the aperture in the end 205 of the shackle body 201. The pin 625 can be removed from the shackle body 201 using the actuator assembly 680. Specifically, the actuator 613 retracts the pin coupling feature 685, which in turn retracts the pin 625 because the pin coupling feature 685 is coupled to the actuator assembly coupling feature 670.

In some cases, a retention feature (e.g., retention plate 690, retention feature 766) is engaged when the pin coupling feature 685 of the actuator assembly 680 is coupled to the actuator assembly coupling feature 670 of the pin 625. The retention feature can be engaged in the same way (e.g., hydraulically, mechanically) that, or in a different way than, the pin coupling feature 685 is coupled to the actuator assembly coupling feature 670. In such a case, the retention feature is disengaged prior to performing step 806 so that the pin 625 can be removed from the shackle body 201, thus releasing the equipment 202 from the lifting shackle 600. In certain example embodiments, the pin 625 (including the actuator assembly coupling feature 670), the mounting adapter 650 (including the actuator assembly coupling feature 654), and the actuator assembly 680 (including the pin coupling feature 685 and the docking receptacle coupling feature 681) are without mating threads.

In step 808, the docking receptacle coupling feature 681 of the actuator assembly 680 is decoupled from the actuator assembly coupling feature 654 of the docking receptacle 655. The docking receptacle coupling feature 681 can be decoupled from the actuator assembly coupling feature 654 using the actuator 613 of the actuator assembly 680 while under the water 533. Simultaneously, or independently, the pin coupling feature 685 of the actuator assembly 680 is decoupled from the actuator assembly coupling feature 670 of the pin 625. In such a case, the pin 625 can be reinserted into the shackle body 201 after the equipment 202 is disengaged from the pin 625 and the rest of the lifting shackle 600. In certain example embodiments, the pin coupling feature 685 is decoupled from the actuator assembly coupling feature 670 using the actuator 613 of the actuator assembly 680 while under the water 533.

In some cases, the pin coupling feature 685 of the actuator assembly 680 remains coupled to the actuator assembly coupling feature 670 of the pin 625 after the docking receptacle coupling feature 681 of the actuator assembly 680 is decoupled from the actuator assembly coupling feature 654 of the docking receptacle 655. In this way, the pin 625 and the actuator assembly 680 are removed from under the water 533 together. As stated above, significant amounts of time (e.g., months, years) can elapse with the lifting shackle 201 under water 533 before the method 800 of FIG. 8 is performed. When step 808 is complete, the method 800 ends at the END step.

In some cases, some or all of the steps of the method 800 can be reversed when the pin 625 is coupled to (inserted into) the lifting shackle 201 using the actuator assembly 680. The pin 625 can be coupled to the lifting shackle 201 under water 533 or above the water level 331.

The systems, methods, and apparatuses described herein allow for safe and more efficient assembly and disassembly of a lifting shackle, particularly while under water. As a result, example embodiments significantly reduce the risk of injury and the amount of time required to assemble and/or disassemble the lifting shackle. This, in turn, saves significant costs. Further, example lifting shackles work equally as effectively as currently used lifting shackles. Further, example lifting shackles can be left under water for substantial periods of time without the risk of being able to assemble or disassemble (remove the pin from) the lifting shackle.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A subsea remotely operated lifting shackle for use in a subsea field operation, comprising:
a first mounting adapter disposed over a portion of a first end of a shackle body, wherein the first mounting adapter comprises:
a frame; and
a docking receptacle coupled to the frame, wherein the docking receptacle comprises at least one first actuator assembly coupling feature and a channel that traverses therethrough, wherein the channel aligns with a first aperture that traverses the first end of the shackle body;
a pin comprising a proximal end, a distal end, and at least one second actuator assembly coupling feature disposed in the distal end, wherein the pin is disposed within the channel and the first aperture; and
an actuator assembly removably coupled to the first mounting adapter, wherein the actuator assembly comprises:
an actuator body;
an actuator coupled to the actuator body;
at least one docking receptacle coupling feature operatively controlled by the actuator, wherein the at least one docking receptacle coupling feature removably couples, using the actuator, to the at least one first actuator assembly coupling feature of the first mounting adapter; and
at least one pin coupling feature operatively controlled by the actuator, wherein the at least one pin coupling feature removably couples, using the actuator, to the at least one second actuator assembly coupling feature of the pin,
wherein the actuator couples the at least one docking receptacle coupling feature to the at least one first actuator assembly coupling feature of the first mounting adapter and couples the at least one pin coupling feature to the at least one second actuator assembly coupling feature of the pin while under water during the subsea field operation.

2. The lifting shackle of claim 1, wherein the at least one docking receptacle coupling feature of the actuator assembly has a male configuration, and wherein the at least one first actuator assembly coupling feature of the docking receptacle has a female configuration that receives the at least one docking receptacle coupling feature.

3. The lifting shackle of claim 2, wherein the docking receptacle further comprises a retention feature that maintains a coupling between the at least one first actuator assembly coupling feature and the at least one docking receptacle coupling feature.

4. The lifting shackle of claim 2, wherein the at least one docking receptacle coupling feature of the actuator assembly comprises a retention feature that maintains a coupling between the at least one first actuator assembly coupling feature and the at least one docking receptacle coupling feature.

5. The lifting shackle of claim 4, wherein the retention feature is engaged by the actuator.

6. The lifting shackle of claim 1, wherein the at least one pin coupling feature of the actuator assembly has a male configuration, and wherein the at least one second actuator assembly coupling feature of the pin has a female configuration that receives the at least one pin coupling feature.

7. The lifting shackle of claim 6, wherein the at least one pin coupling feature of the actuator assembly comprises at least one retractable protrusion.

8. The lifting shackle of claim 7, wherein the at least one pin coupling feature of the actuator assembly further comprises a retention feature that maintains the at least one retractable protrusion in a protruding position.

9. The lifting shackle of claim 1, wherein the lifting shackle further comprises a second mounting adapter coupled to a second end of the shackle body, wherein the second mounting adapter comprises at least one guiding feature and a retention plate, wherein the retention plate is slidably disposed within the at least one guiding feature, wherein the retention plate is movably coupled to a retention feature of the pin when the pin is in an engaged position, wherein the pin is further disposed within a second aperture that traverses the second end of the shackle body.

10. The lifting shackle of claim 9, wherein the second mounting adapter further comprises a locking feature that secures the plate when the plate is engaged with the retention feature of the pin.

11. The lifting shackle of claim 1, wherein the at least one docking receptacle coupling feature and the at least one pin coupling feature are disposed on a same side of the actuator body.

12. The lifting shackle of claim 1, wherein the pin is without mating threads.

13. The lifting shackle of claim 1, wherein the at least one second actuator assembly coupling feature is without mating threads.

14. An actuator assembly for a subsea remotely operated lifting shackle for use in a subsea field operation, comprising:
    an actuator body;
    an actuator coupled to the actuator body; and
    at least one docking receptacle coupling feature operatively controlled by the actuator, wherein the at least one docking receptacle coupling feature removably couples, using the actuator, to at least one first actuator assembly coupling feature of a mounting adapter of the lifting shackle; and
    at least one pin coupling feature operatively controlled by the actuator, wherein the at least one pin coupling feature removably couples, using the actuator, to at least one second actuator assembly coupling feature of the mounting adapter of the lifting shackle,
    wherein the actuator couples the at least one docking receptacle coupling feature to the at least one first actuator assembly coupling feature of the mounting adapter and the at least one pin coupling feature to the at least one second actuator assembly coupling feature of the mounting adapter while under water during the subsea field operation.

15. A method for disassembling a lifting shackle for use in an operation in a subsea field, the method comprising:
    positioning, while under water in the subsea field, an actuator assembly proximate to a docking receptacle of a mounting adapter, wherein the mounting adapter is coupled to a shackle body of the lifting shackle; and
    coupling, using an actuator of the actuator assembly while under the water, at least one pin coupling feature of the actuator assembly to at least one first actuator assembly coupling feature of a pin of the lifting shackle, wherein the pin is disposed in a channel of the mounting adapter, a first aperture of the shackle body, and a second aperture of the shackle body;
    coupling, when coupling the at least one pin coupling feature of the actuator assembly to the at least one first actuator assembly coupling feature of the pin, at least one docking receptacle coupling feature of the actuator assembly to at least one second actuator assembly coupling feature of the docking receptacle using the actuator of the actuator assembly while under the water; and
    removing the pin from the shackle body using the actuator assembly.

16. The method of claim 15, further comprising:
    disengaging, prior to removing the pin, a retention feature when the at least one pin coupling feature of the actuator assembly is coupled to the at least one first actuator assembly coupling feature of the pin.

17. The method of claim 15, further comprising:
    decoupling, after removing the pin and using the actuator of the actuator assembly while under the water, at least one docking receptacle coupling feature of the actuator assembly from at least one second actuator assembly coupling feature of the docking receptacle.

18. The method of claim 17, further comprising:
    reinserting, after decoupling the at least one docking receptacle coupling feature from the at least one second actuator assembly coupling feature and using the actuator of the actuator assembly while under the water, the pin into the shackle body.

19. The method of claim 15, wherein the actuator is controlled hydraulically by a user.

20. The method of claim 15, wherein coupling the at least one pin coupling feature of the actuator assembly to the at least one first actuator assembly coupling feature of the pin is performed without the use of mating threads.

\* \* \* \* \*